US011862066B2

(12) United States Patent
Koo et al.

(10) Patent No.: US 11,862,066 B2
(45) **Date of Patent: *Jan. 2, 2024**

(54) FRAME REPLAY FOR VARIABLE RATE REFRESH DISPLAY

(71) Applicant: ATI TECHNOLOGIES ULC, Markham (CA)

(72) Inventors: Anthony W L Koo, Markham (CA); Syed Athar Hussain, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/706,790

(22) Filed: Mar. 29, 2022

(65) Prior Publication Data

US 2022/0223098 A1 Jul. 14, 2022

Related U.S. Application Data

(63) Continuation of application No. 16/436,876, filed on Jun. 10, 2019, now Pat. No. 11,295,660.

(51) Int. Cl.

*G09G 5/00* (2006.01)
*G09G 3/20* (2006.01)
*G09G 5/36* (2006.01)

(52) U.S. Cl.

CPC ........... *G09G 3/2096* (2013.01); *G09G 5/006* (2013.01); *G09G 5/363* (2013.01); *G09G 2310/08* (2013.01); *G09G 2320/0247* (2013.01); *G09G 2320/10* (2013.01); *G09G 2320/103* (2013.01);

(Continued)

(58) Field of Classification Search

None

See application file for complete search history.

(56) References Cited

U.S. PATENT DOCUMENTS 9,251,552 B2 2/2016 Kwa et al.
9,524,008 B1 12/2016 Woodall et al.
9,652,816 B1 5/2017 Holland et al.

(Continued)

FOREIGN PATENT DOCUMENTS

CN 1989545 6/2007
CN 101149640 3/2008

(Continued)

OTHER PUBLICATIONS

Office Action issued in Chinese Application No. 202080043008, dated Jul. 27, 2022, 8 pages.

(Continued)

*Primary Examiner* — Joni Hsu

(57) ABSTRACT

A graphics processing unit (GPU) instructs a display control module to capture content and display captured content in response to the refresh rate of a display exceeding a frame generation rate of the GPU. Rather than re-transmit the same frame multiple times, the GPU instructs the display control module to replay a previously-transmitted frame. During a refresh cycle in which the display control module is replaying captured content, the GPU omits accessing memory to retrieve and resend the frame that is being replayed, and instead sends only invalid data and GPU timing information so that the display control module remains synchronized with the GPU.

20 Claims, 5 Drawing Sheets

(52) U.S. Cl.
CPC . *G09G 2340/0435* (2013.01); *G09G 2360/18* (2013.01)

(56) References Cited

U.S. PATENT DOCUMENTS

| | | | | |
|---|---|---|---|---|
| 9,786,255 | B2 * | 10/2017 | Verbeure | G09G 3/3611 |
| 2012/0147020 | A1 | 6/2012 | Hussain et al. | |
| 2014/0002739 | A1 | 1/2014 | Kwa et al. | |
| 2015/0348509 | A1 | 12/2015 | Verbeure et al. | |
| 2016/0284264 | A1 | 9/2016 | Lee et al. | |
| 2017/0249920 | A1 | 8/2017 | Cook et al. | |

FOREIGN PATENT DOCUMENTS

| | | |
|---|---|---|
| CN | 101536507 | 9/2009 |
| CN | 101819510 | 9/2010 |
| CN | 102239696 | 11/2011 |
| CN | 103282956 | 9/2013 |
| CN | 104641412 | 5/2015 |
| CN | 104917990 | 9/2015 |
| CN | 105185284 | 12/2015 |
| CN | 103151025 | 6/2016 |
| CN | 106415698 | 2/2017 |
| EP | 1160759 | 12/2001 |
| JP | 2007164071 | 6/2007 |

OTHER PUBLICATIONS

Office Action issued in Chinese Application No. 202080043008.X, dated Feb. 22, 2023, 21 pages.

Extended European Search Report issued in European Application No. 20823340.3, dated May 17, 2023, 9 pages.

Korean Office Action issued in Application No. 10-2021-7040649, dated Jul. 12, 2023, 3 pages.

Japanese Office Action dated Sep. 5, 2023 in Application No. 2021-571832, 2 pages.

Indian Office Action issued in Application No. 202117055892, dated Oct. 23, 2023, 7 pages.

Chinese Office Action dated Aug. 11, 2023 in Application No. 202080043008, 18 pages.

* cited by examiner

FRAME REPLAY FOR VARIABLE RATE REFRESH DISPLAY

CROSS-REFERENCE TO RELATED APPLICATIONS

The present application is a continuation application of U.S. patent application Ser. No. 16/436,876, entitled "FRAME REPLAY FOR VARIABLE RATE REFRESH DISPLAY", and filed on Jun. 10, 2019, now U.S. Pat. No. 11,295,660 the entirety of which is incorporated by reference herein.

BACKGROUND

A typical processing system employs a graphics processing unit (GPU) to generate images for display. In particular, based on information received from a central processing unit (CPU) or other processing unit, the GPU generates a series of frames and renders the series of frames at a display, such as a computer monitor. Two different timing factors govern the rate at which the series of frames can be displayed: the rate at which the GPU generates frames and the refresh rate of the display. Some processing systems improve the user experience by synchronizing the display refresh with the generation of frames at the GPU. For example, by adjusting a blanking interval of the display, the processing system can ensure that the display is refreshed at or near the time that a new frame is ready for display at the GPU. However, in many scenarios the display refresh rate exceeds the rate at which the GPU generates frames, sometimes by more than double. A mismatch in the frame generation rate versus the refresh rate of the display can result in unnecessary expenditure of processing system resources and, in some cases, flickering and other visual artifacts that negatively impact the user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for instructing a display control module to capture content and display captured content in response to the refresh rate of a display exceeding a frame generation rate of a graphics processing unit (GPU) while reducing accesses by the GPU to memory while captured content is being replayed at the display. Display refresh rates often exceed the rate at which a GPU generates frames, sometime by a factor of two or more. Rather than re-transmit the same frame multiple times, the GPU instructs the display control module to replay a previously-transmitted frame. The GPU detects the rate of frame generation based on, for example, the frame rate of a fixed-rate video stream or the complexity of the frames being generated for a variable frame rate gaming application. In response to determining that a frame should be replayed (for example, by detecting that the display refresh rate exceeds the rate of frame generation by at least a threshold amount), the GPU instructs the display control module to capture and then replay captured content rather than retransmitting a frame for display a second (or more) time. During a refresh cycle in which the display control module is replaying captured content, the GPU omits accessing memory to retrieve (and resend) the frame that is being replayed, and instead sends only dummy content (e.g., invalid data) and GPU timing information so that the display control module remains synchronized with the GPU. The GPU thus saves memory bandwidth and power by reducing the number of accesses to memory while captured content is being replayed at the display.

Figure 1:
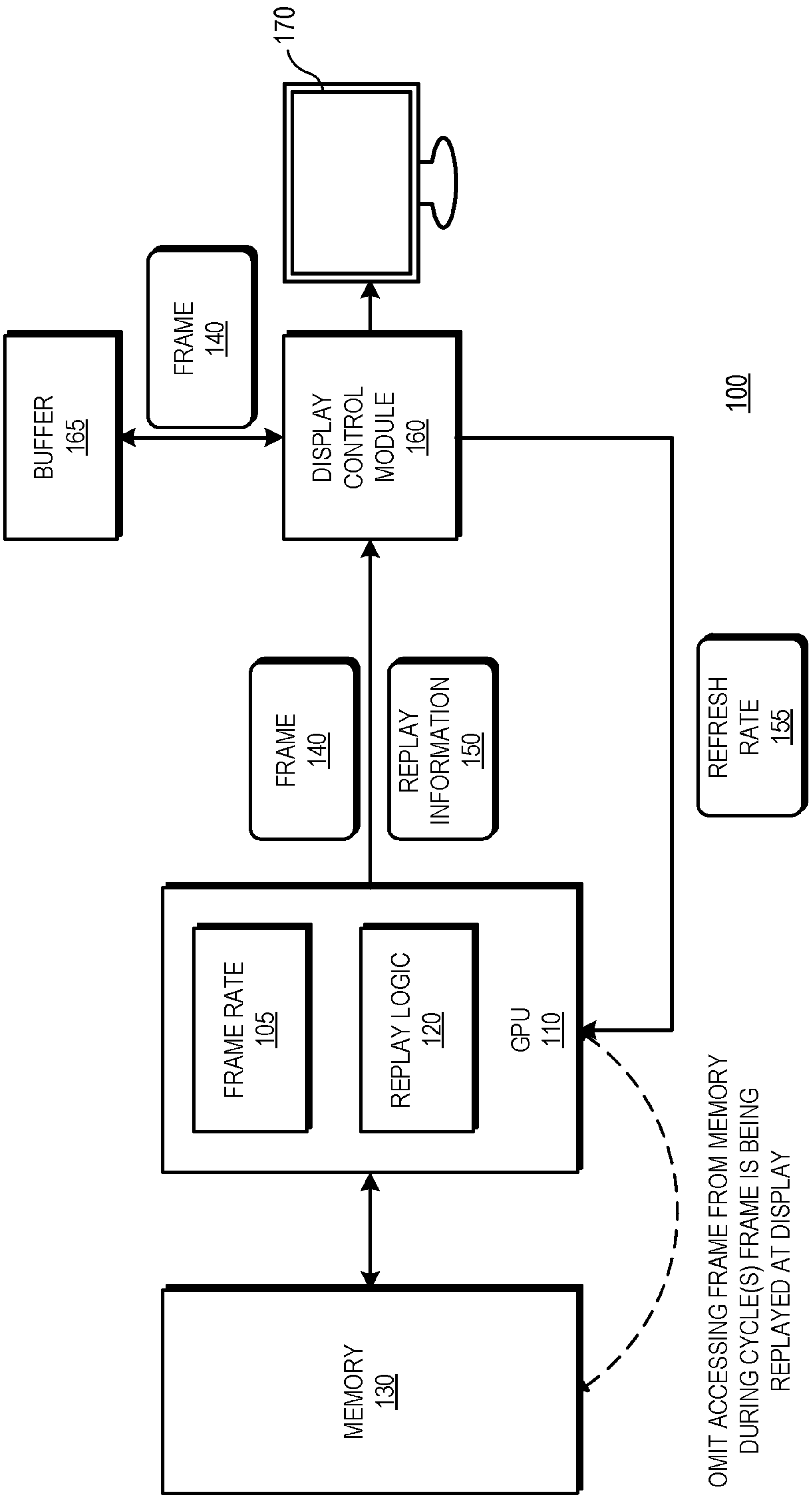
FIG. 1 is a block diagram of a processing system configured to instruct a display control module for a display device to capture and replay a frame based on a mismatch between a display refresh rate and a rate at which a graphics processing unit generates frames in accordance with some embodiments.

FIG. 1 illustrates a processing system 100 to instruct a display control module 160 for a display device 170 to capture and replay a frame when a display refresh rate exceeds a rate at which a graphics processing unit generates frames in accordance with some embodiments. The processing system 100 executes sets of instructions (e.g., computer programs) to carry out specified tasks for an electronic device. Examples of such tasks include controlling aspects of the operation of the electronic device, displaying information to a user to provide a specified user experience, communicating with other electronic devices, and the like. Accordingly, in different embodiments the processing system 100 is employed in one of a number of types of electronic devices, such as a desktop computer, laptop computer, server, game console, tablet, smartphone, and the like.

To support execution of the sets of instructions, the processing system 100 includes a plurality of processor cores (not shown at FIG. 1). In some embodiments, each processor core includes one or more instruction pipelines to fetch instructions, decode the instructions into corresponding operations, dispatch the operations to one or more execution units, execute the operations, and retire the operations. In the course of executing instructions, the processor cores generate graphics operations and other operations associated with the visual display of information. Based on these operations, the processor cores provide commands and data to a graphics processing unit (GPU) 110, illustrated at FIG. 1.

The GPU 110 receives the commands and data associated with graphics and other display operations from the plurality of processor cores. Based on the received commands, the GPU 110 executes operations to generate frames (e.g., frame 140) for display. Examples of operations include vector operations, drawing operations, and the like. The rate at which the GPU 110 is able to generate frames based on these operations is referred to as the frame generation rate, or simply the frame rate, of the GPU 110. The frame generation rate is illustrated at FIG. 1 as frame rate 105. It will be appreciated that the frame rate 105 varies over time, based in part on the complexity of the operations executed by the GPU to generate a set of frames. For example, sets of frames requiring a relatively high number of operations (as a result of drawing a relatively large number of moving objects for example) are likely to cause a lower frame rate, while sets of frames requiring a relatively low number of operations are likely to allow for a higher frame rate. Further, for some applications, the frame rate 105 is fixed, and for other applications the frame rate 105 is variable. As a user switches from one application to another, the frame rate 105 can switch from fixed to variable and vice versa.

The graphics processing unit 110 is coupled to a memory 130. The GPU 110 executes instructions and stores information in the memory 130 such as the results of the executed instructions. For example, the memory 130 stores a plurality of previously-generated images (not shown) that it receives from the GPU 110. In some embodiments, the memory 130 is implemented as a dynamic random access memory (DRAM), and in some embodiments, the memory 130 is implemented using other types of memory including static random access memory (SRAM), non-volatile RAM, and the like. Some embodiments of the processing system 100 include an input/output (I/O) engine (not shown) for handling input or output operations associated with the display 170, as well as other elements of the processing system 100 such as keyboards, mice, printers, external disks, and the like.

To display frames, the processing system 100 includes a display control module 160 and a display 170. The display 170 is a display device that visually displays images based on the frames generated by the GPU 110. Accordingly, in different embodiments the display 170 is a liquid crystal display (LCD) device, an organic light-emitting diode (OLED) device, and the like. As will be appreciated by one skilled in the art, the display 170 periodically renders (or "draws") the most recent frame generated by the GPU 110, thereby displaying the frame. In some embodiments, the display 170 has a fixed refresh rate 155. Each frame render is associated with a portion of time, referred to as a blanking interval, during which the display 170 does not render image data. In some embodiments, the display 170 has a blanking interval of programmable length. Accordingly, as described further herein, in some embodiments the display 170 has a variable refresh rate 155 that is adjustable by programming different lengths for the blanking interval.

The display control module 160 controls the rendering of frames at the display 170 and is implemented as hard-coded logic on one or more integrated circuit (IC) chips, as programmable logic, as configurable logic (e.g., fuse-configurable logic), one or more processors executing a program of instructions, or a combination thereof. In some embodiments the display control module 160 performs operations including buffering of frames generated by the GPU 110, adjustment of the refresh rate 155 of the display 170 by programming different blanking interval lengths, and the like. It will be appreciated that although the display control module 160 is illustrated as a separate module from the GPU 110 for ease of illustration, in some embodiments the display control module 160 is incorporated in the GPU 110. In other embodiments, one or more operations of the display control module 160 are performed at the display 170.

To conserve memory bandwidth and reduce accesses to memory 130 by the GPU 110, the GPU 110 includes replay logic 120, which compares the refresh rate 155 of the display 170 to the frame rate 105 of the GPU 110 and determines whether the display control module 160 is to display live content (i.e., a current frame) at the display 170, capture live content at a buffer 165, and display (replay) captured content based on the relative rates, and to transmit instructions to the display control module 160. The replay logic 120 is implemented as hard-coded logic on one or more integrated circuit (IC) chips, as programmable logic, as configurable logic (e.g., fuse-configurable logic), one or more processors executing a program of instructions, or a combination thereof.

To illustrate, in operation, the replay logic 120 detects whether a replay mode is supported at the display 170. In response to detecting that replay mode is supported at the display 170, the replay logic 120 signals the display control module 160 to enable replay mode. Once replay mode has been enabled, the replay logic 120 determines for a current frame 140 whether the refresh rate 155 of the display 170 exceeds the frame rate 105 of the GPU 110 by more than a threshold amount. In some embodiments, the threshold amount is double the frame rate 105. Thus, if the frame rate 105 is half or less than half of the display refresh rate 155, the threshold amount is met. In other embodiments, the threshold amount is slightly more than the frame rate 105, but not necessarily double. For example, for a fixed refresh rate display having a refresh rate 155 slightly higher than the frame rate 105, some amount of frames will be repeated, in which case the GPU 110 signals the display control module 160 to replay a frame 140.

If the refresh rate 155 of the display 170 does not exceed the frame rate 105 of the GPU 110 by more than the threshold amount, the replay logic 120 determines that the display control module 160 is to display the current frame 140 at the display 170 (i.e., the display 170 is to display live content). The replay logic 120 transmits the frame 140 and replay information 150 indicating that the display control module 160 is to display the current frame 140 at the display 170. Because in this example the replay logic 120 has determined that the display control module 160 is to display the current frame 140 at the display without capturing the current frame 140 or re-displaying a previously-captured frame, the replay information 150 indicates only that the display control module 160 is to display the current frame 140 at the display 170 for the current display refresh cycle. At the next display refresh cycle, the GPU 110 will transmit a next frame and replay information to the display control module 160.

If the refresh rate 155 of the display 170 exceeds the frame rate 105 by more than the threshold amount (e.g., the refresh rate 155 is at least double the frame rate 105), the refresh logic 120 determines that the display control module 160 is to capture the current frame 140 for subsequent replay at the display 170. Thus, the replay logic 120 transmits the current frame 140 and replay information 150 indicating that the display control module 160 is to display the current frame 140 at the display 170 and capture the current frame 140 at the buffer 165. In response, the display control module 160 displays the current frame 140 at the display 170 and copies the current frame 140 to the buffer 165. For the subsequent refresh cycle of the display 170, the GPU 110 omits accessing the current frame 140 from the memory 130 and instead transmits dummy content (not shown) to the display control module 160 with replay information 150 indicating that the display control module 160 is to use the frame rate timing of the GPU 110 and replay the previously captured current frame 140 at the display 170. The replay logic 120 repeats the transmission of dummy content and replay information 150 indicating that the display control module 160 is to replay the previously captured current frame 140 as many times as the refresh rate 155 exceeds the frame rate 105, or until a new frame has been generated by the GPU 110.

Thus, for example, if the frame rate 105 is 24 frames per second (fps) and the refresh rate of the display 170 is 48 Hz, there are two refresh cycles of the display 170 for each frame that is generated by the GPU 110. If both rates are fixed, during a first display refresh cycle, the replay logic 120 transmits a current frame N 140 and replay information 150 indicating that the display control module 160 is to display the current frame N 140 at the display 170 and capture the current frame N 140 at the buffer 165. During a second display refresh cycle, the replay logic 120 transmits dummy content and replay information 150 indicating that the display control module 160 is to replay the previously captured frame N 140. The display control module 160 discards the dummy content and accesses the previously captured frame N 140 from the buffer 165 for display at the display 170. During a third display refresh cycle, the GPU 110 generates a current frame N+1 140, and the replay logic 120 transmits the current frame N+1 140 and replay information 150 indicating that the display control module 160 is to display the current frame N+1 140 at the display 170 and capture the current frame N+1 140 at the buffer 165. During a fourth display refresh cycle, the replay logic 120 transmits dummy content and replay information 150 indicating that the display control module 160 is to replay the previously captured frame N+1 140. The display control module 160 discards the dummy content and accesses the previously captured frame N+1 140 from the buffer 165 for display at the display 170. Accordingly, during the second and fourth display refresh cycles, the GPU 110 omits accessing the N and N+1 frames from the memory 130 and retransmitting them to the display control module 160 while the N and N+1 frames are being replayed at the display 170.

In some embodiments, such as during a PowerPoint® presentation, a single frame is displayed over an extended amount of time and unchanged. The replay logic 120 detects that the content of the frame is unchanging and signals the display control module 160 to capture and continually replay the static frame. In this scenario, the replay logic 120 dynamically determines on a frame-by-frame basis whether to signal the display control module 160 to replay the captured frame. The replay logic 120 determines whether to signal the display control module 160 to replay the captured frame independently of the GPU frame rate 105, determining instead to continue to replay captured content until the frame content changes. If the replay logic 120 detects a static frame content and signals the display control module 160 to capture the frame, but on the subsequent frame determines that the content has changed, the replay logic 120 reverts to transmitting the current frame 140 and replay information 150 indicating that the display control module 160 is to display the current frame 140 at the display 170. Thus, the replay logic 120 dynamically determines to play live content, and the captured frame is not used in this case.

In some embodiments, the refresh rate 155 of the display 170 is more than double the frame rate 105 of the GPU 110. In such cases, the replay logic 120 determines to instruct the display control module 160 to display the captured content for more than two refresh cycles of the display 170. In other embodiments in which the display has a variable refresh rate, even if the refresh rate 155 of the display 170 could be synchronized with the frame rate 105 of the GPU 110, the replay logic 120 may determine that the user experience would be enhanced if the display refresh rate is set at a higher rate, to reduce flicker. In such cases, the replay logic 120 instructs the display control module 160 to capture live content and then display the captured live content for at least two higher-rate refresh cycles of the display 170. The term "live content", as used herein, refers to frames generated by the GPU that have not been stored by the display control module 160 for re-display.

In some embodiments, the display 170 has a variable refresh rate with a range of refresh frequencies. For example, in some embodiments, the display 170 has a refresh rate that can be dynamically changed within a range of 40 Hz to 120 Hz. If a gaming application executing at the GPU 110 has a frame rate of 30 frames per second, the replay logic 120 determines a number of frame replays and a display refresh rate for the display 170 that will optimize a user experience. For example, if the replay logic 120 determines, as a first option, to refresh the display at 90 Hz, the replay logic 120 signals the display control module 160 to capture a frame during a first refresh cycle and replay the frame twice. Alternatively, as a second option, the replay logic 120 could determine to refresh the display at 60 Hz, and to replay the frame once or, as a third option, the replay logic 120 could determine to refresh the display at 120 Hz, and to replay the frame three times. Determining a display refresh rate and number of frame replays can impact whether side effects like stutter or tearing are observable, particularly for variable frame rate content such as gaming applications. In this example, the second option (60 Hz, one replay) has a lower refresh rate that saves power. However, the first option (90 Hz, two replays) is in the middle of the refresh rate range of 40 Hz to 120 Hz of the display 170, and provides less opportunity for stuttering or tearing to occur if there are frame rate changes due to frame-to-frame variations in rendering complexity. Thus, the first option may provide an improved user experience for variable rate content.

Figure 2:
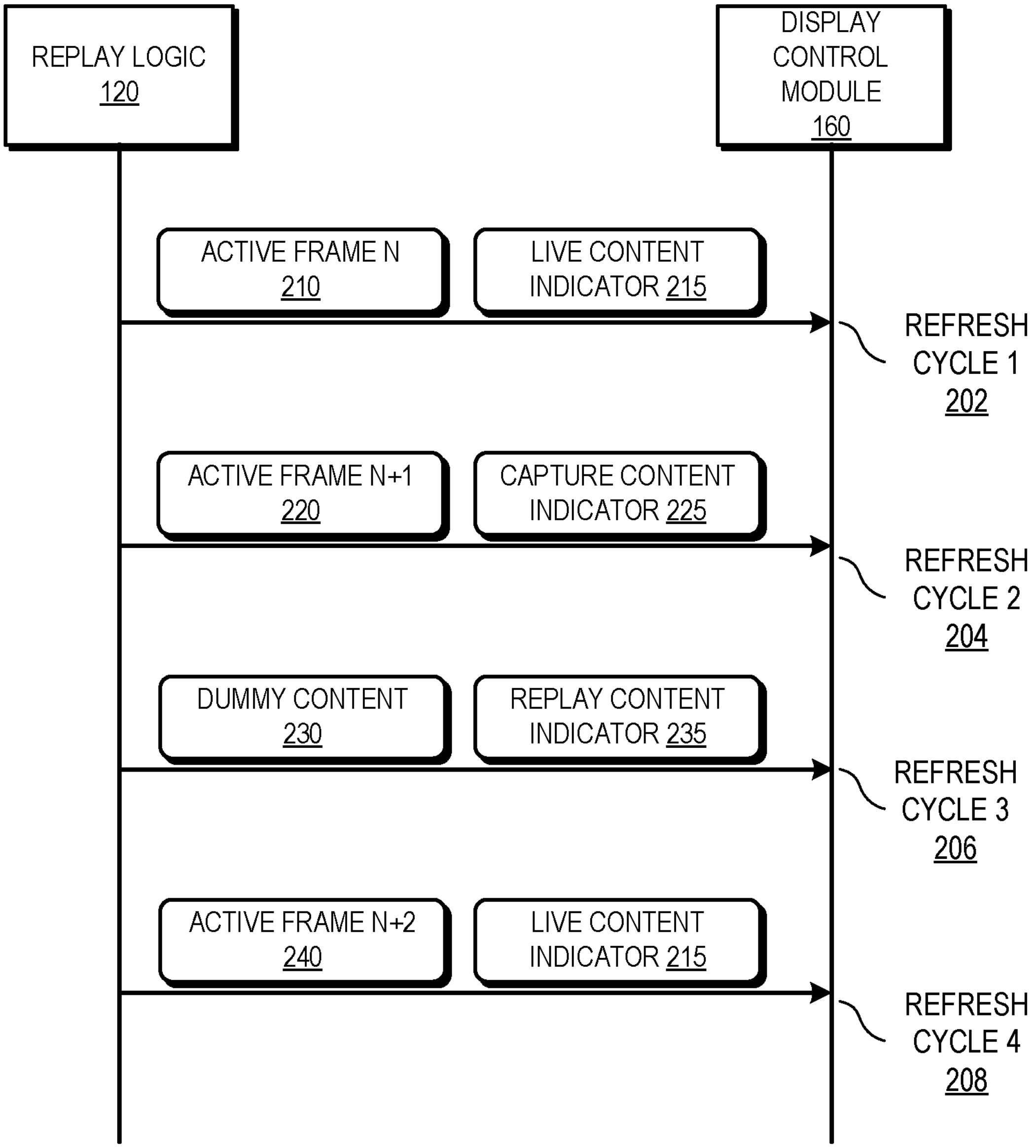
FIG. 2 is a diagram illustrating an example of the processing system of FIG. 1 instructing a display control module to capture and replay content in accordance with some embodiments.

FIG. 2 is a diagram illustrating an example of the replay logic 120 of the GPU 110 of the processing system 100 of FIG. 1 instructing the display control module 160 to capture and replay content in accordance with some embodiments. During a first refresh cycle 1 202, the replay logic 120 detects that the refresh rate 155 of the display 170 does not exceed the frame rate 105 of the GPU 110 by more than a threshold amount, and therefore determines that the display 170 is to display live content. Accordingly, the replay logic 120 transmits the active (current) frame N 210 and a live content indicator 215 to the display control module 160, indicating that the display control module 160 is to display the active frame N 210 at the display 170.

During a second refresh cycle 2 204, the replay logic 120 detects that the refresh rate 155 of the display 170 exceeds the frame rate 105 of the GPU 110 by more than a threshold amount (for example, the replay logic 120 detects that the refresh rate 155 of the display 170 is more than double the frame rate 105 of the GPU 110), and therefore determines that the display 170 is to display live content while the display control module 160 captures the live content and stores the live content at the buffer 165. The replay logic 120 therefore transmits active frame N+1 220 and capture content indicator 225 to the display control module 160. In response to receiving the capture content indicator 225, the display control module 160 copies the active frame N+1 220 at the buffer 165 and displays the active frame N+1 220 at the display 170.

During a third refresh cycle 3 206, the replay logic 120 confirms that the refresh rate 155 of the display 170 still exceeds the frame rate 105 of the GPU 110 by more than the threshold. Because the replay logic 120 has already transmitted the active frame N+1 220 to the display control module 160 and instructed the display control module 160 to capture the active frame N+1 220, the GPU 110 does not need to re-transmit the active frame N+1 220 to the display control module 160 or re-access the active frame N+1 220 from memory 130. Instead, the replay logic 120 transmits dummy content 230 and a replay content indicator 235 to the display control module 160. In response to receiving the dummy content 230 and replay content indicator 235, the display control module 160 discards the dummy content 230, accesses the active frame N+1 220 from the buffer 165, and displays the active frame N+1 220 at the display 170.

During a fourth refresh cycle 4 208, the replay logic 120 detects that the refresh rate 155 of the display 170 does not exceed the frame rate 105 of the GPU 110 by more than the threshold. The replay logic 120 therefore determines that the display 170 is to display live content. Accordingly, the replay logic 120 transmits the active (current) frame N+2 240 and the live content indicator 215 to the display control module 160, indicating that the display control module 160 is to display the active frame N+2 240 at the display 170.

Figure 3:
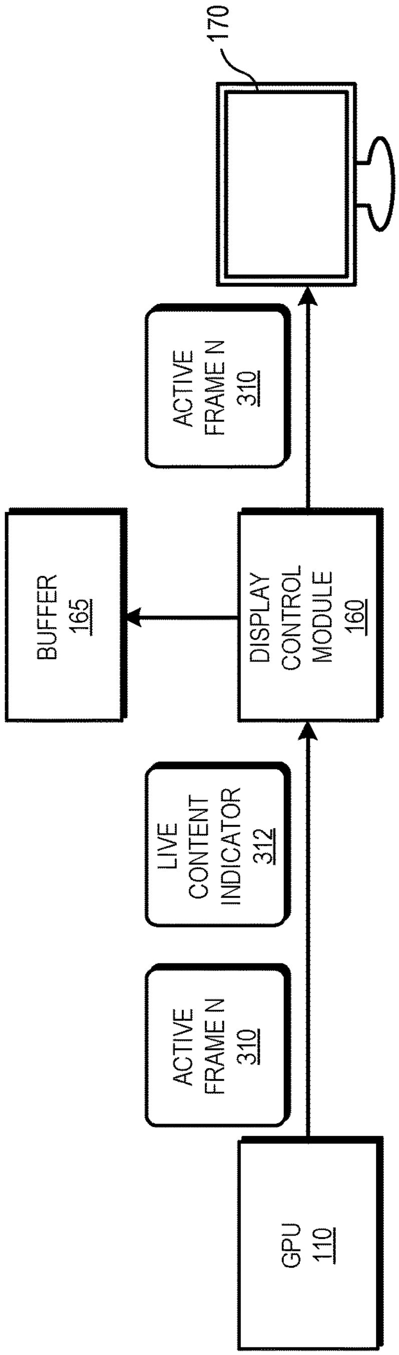
FIG. 3 is a block diagram of an example of the graphics processing unit of the processing system of FIG. 1 instructing the display control module to display live content in accordance with some embodiments.

FIG. 3 is a block diagram of an example of the graphics processing unit 110 of the processing system 100 of FIG. 1 instructing the display control module 160 to display live content in accordance with some embodiments. In the illustrated example, the replay logic (not shown) of the GPU 110 has determined that the refresh rate of the display 170 does not exceed the frame rate of the GPU 110 by more than a threshold amount. The GPU 110 therefore transmits the active frame N 310 and replay information in the form of a live content indicator 312 to the display control module 160, signaling that the display control module 160 is to display the active frame N 310 at the display 170 without storing the active frame N 310 at the buffer 165. In response to receiving the active frame N 310 and the live content indicator 312, the display control module 160 displays the active frame N 310 at the display 170 without capturing the active frame N 310 at the buffer 165.

Figure 4:
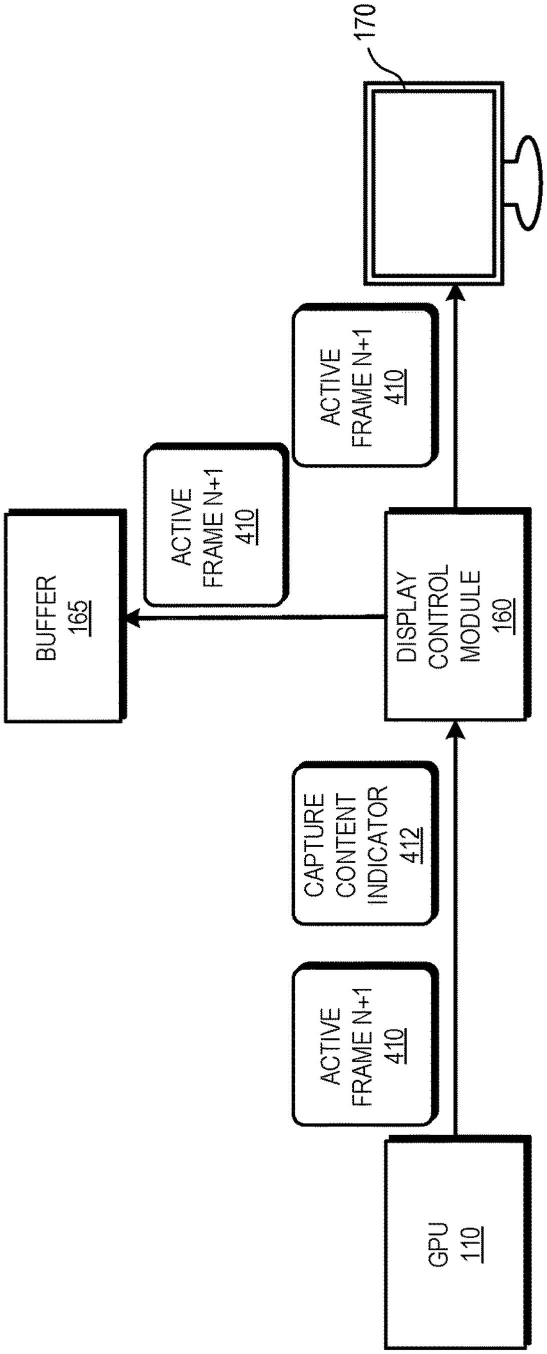
FIG. 4 is a diagram of an example of the graphics processing unit of the processing system of FIG. 1 instructing the display control module to capture content and display live content in accordance with some embodiments.

FIG. 4 is a diagram of an example of the graphics processing unit 110 of the processing system 100 of FIG. 1 instructing the display control module 160 to capture content and display live content in accordance with some embodiments. In the illustrated example, the replay logic (not shown) of the GPU 110 has determined that the refresh rate of the display 170 exceeds the frame rate of the GPU 110 by more than a threshold amount. The GPU 110 therefore transmits the active frame N+1 410 and a capture live content indicator 412 to the display control module 160, signaling that the display control module 160 is to display the active frame N+1 410 at the display 170 and also copy the active frame N+1 410 at the buffer 165. In response to receiving the active frame N+1 410 and the capture live content indicator 412, the display control module 160 displays the active frame N+1 410 at the display 170 and copies the active frame N+1 to the buffer 165.

Figure 5:
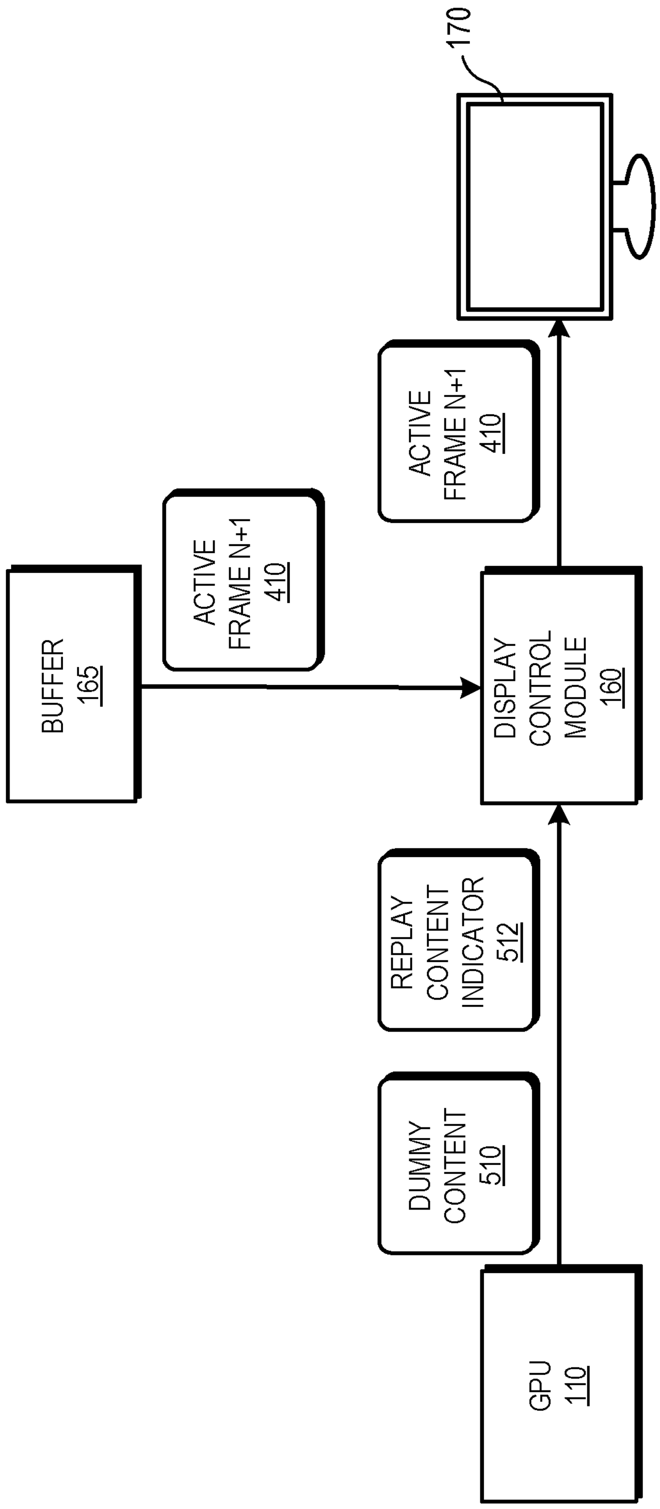
FIG. 5 is a diagram of an example of the graphics processing unit of the processing system of FIG. 1 instructing the display control module to display captured content in accordance with some embodiments.

FIG. 5 is a diagram of an example of the graphics processing unit 110 of the processing system 100 of FIG. 1 instructing the display control module 160 to display captured content in accordance with some embodiments. In the illustrated example, the replay logic (not shown) of the GPU 110 has previously determined that the refresh rate of the display 170 exceeds the frame rate of the GPU 110 by more than a threshold amount and has previously instructed the display control module 160 to capture the previously-transmitted active frame N+1 410, as shown in FIG. 4. For the current display refresh cycle, the GPU 110 transmits dummy content 510 and a replay content indicator 512 to the display control module 160, instructing the display control module 160 to access the active frame N+1 410 from the buffer 165 and display the active frame N+1 410 at the display 170. In response to receiving the dummy content 510 and the replay content indicator 512, the display control module 160 discards the dummy content 510, accesses the active frame N+1 410 from the buffer, and displays the active frame N+1 410 at the display 170 while maintaining synchronicity with the timing of the GPU 110.

Figure 6:
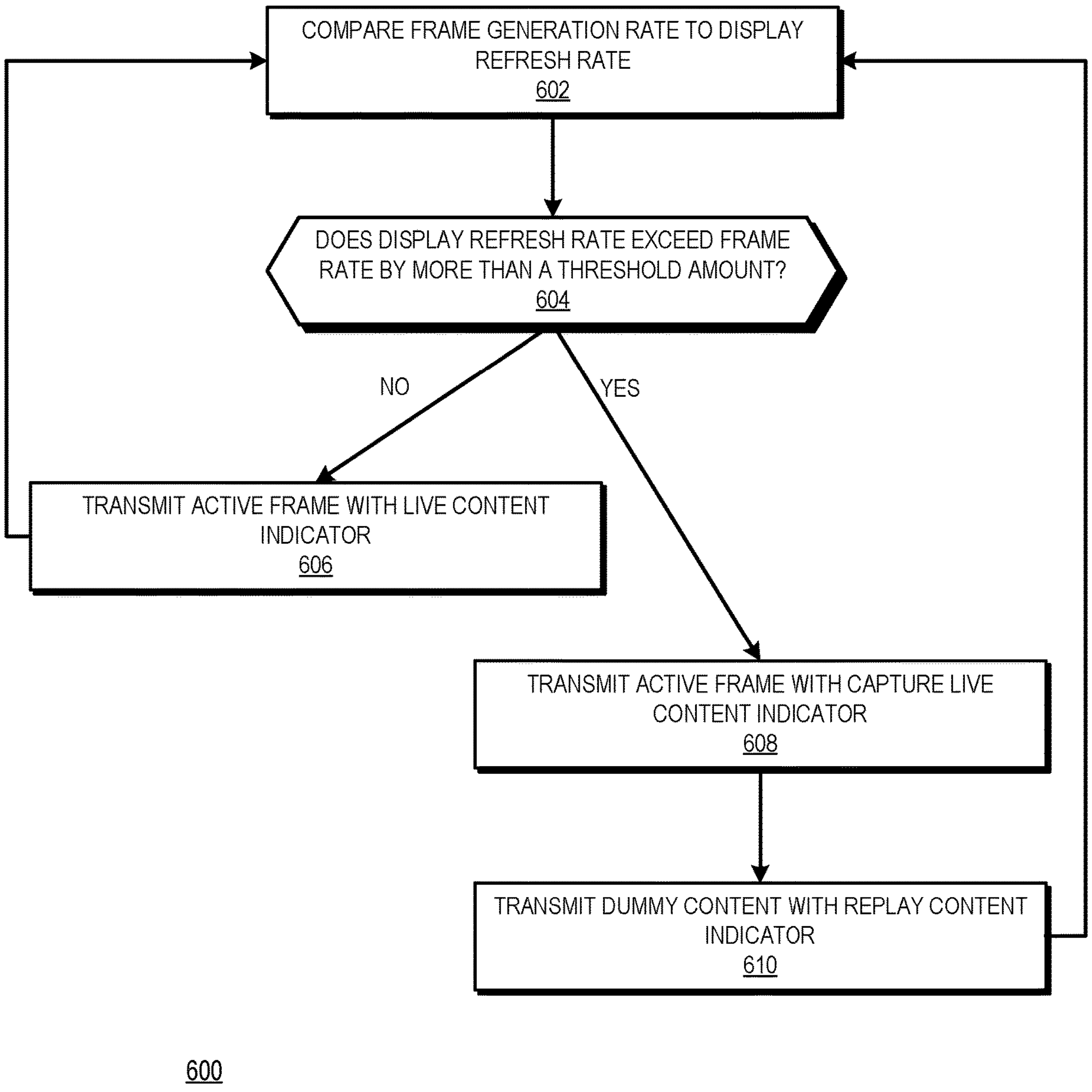
FIG. 6 is a flow diagram of a method of a graphics processing unit instructing a display control module to capture content and display captured content in response to a display refresh rate exceeding a frame generation rate in accordance with some embodiments.

FIG. 6 is a flow diagram of a method 600 of a graphics processing unit instructing a display control module to capture content and display captured content in response to a display refresh rate exceeding a frame generation rate in accordance with some embodiments. The method 600 is implemented in some embodiments of the processing system 100 shown in FIG. 1.

At block 602, the replay logic 120 of the GPU 110 compares the rate 105 at which the GPU 110 generates frames to the refresh rate 155 of the display 170. At block 604, the replay logic 120 determines whether the display refresh rate 155 exceeds the frame rate 105 by more than a threshold amount. If, at block 604, the replay logic 120 determines that the refresh rate 155 does not exceed the frame rate 105 by more than the threshold amount, the method flow continues to block 606. At block 606, the replay logic 120 transmits the active frame N 140 and a live content indicator 215 to the display control module 160. In response to receiving the active frame N 140 and the live content indicator 215, the display control module 160 displays the active frame N 140 at the display 170. The method flow then continues back to block 602.

If, at block 604, the replay logic 120 determines that the refresh rate 155 exceeds the frame rate 105 by more than the threshold amount, the method flow continues to block 608. At block 608, the replay logic 120 transmits the active frame N 140 and a capture content indicator 225 to the display control module 160. In response to receiving the active frame N 140 and the capture content indicator 225, the display control module 160 displays the active frame N 140 at the display 170 and copies the active frame N 140 at the buffer 165. At block 610, the replay logic 120 omits accessing the active frame N 140 from the memory 130, and instead transmits dummy content 230 and a replay content indicator 235 to the display control module 160. In response to receiving the dummy content 230 and replay content indicator 230, the display control module 160 discards the dummy content 230, accesses the active frame N 140 from the buffer 165, and displays the active frame N 140 at the display 170.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc , magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A display device, comprising:

a display control module configured to:

receive, from a graphics processing unit (GPU), a first frame and information associated with the first frame during a first refresh cycle of the display device, the information indicating a number of display refresh cycles during which the display device is to display the first frame; and display the first frame for the number of display refresh cycles indicated by the information.

2. The display device of claim 1, wherein the display control module is further configured to:

capture the first frame in response to the information indicating that the number of display refresh cycles exceeds one display refresh cycle.

3. The display device of claim 1, further comprising:

a buffer, wherein the display control module is further configured to:

store the first frame at the buffer in response to the information indicating that the number of display refresh cycles exceeds one display refresh cycle.

4. The display device of claim 1, wherein the information is based on a refresh rate of the display device exceeding a rate at which the GPU generates the first frame by more than a threshold amount.

5. The display device of claim 1, wherein the display control module is further configured to:

receive, from the GPU, invalid data and GPU timing information for each refresh cycle after the first refresh cycle that the display device is displaying the first frame.

6. The display device of claim 5, wherein the display control module is further configured to:

discard the invalid data.

7. The display device of claim 1, wherein the display control module is further configured to:

determine a refresh rate of the display device, wherein the display device has a variable refresh rate, based on a rate at which the GPU generates the first frame.

8. A method, comprising:

transmitting, at a graphics processing unit (GPU), a first frame and information associated with the first frame to a display device during a first refresh cycle of the display device, the information indicating a number of display refresh cycles during which the display device is to display the first frame; and displaying, at the display device, the first frame for the number of display refresh cycles indicated by the information.

9. The method of claim 8, further comprising:

capturing, at the display device, the first frame in response to the information indicating that the number of display refresh cycles exceeds one display refresh cycle.

10. The method of claim 8, further comprising:

storing the first frame at a buffer associated with the display device in response to the information indicating that the number of display refresh cycles exceeds one display refresh cycle.

11. The method of claim 8, further comprising:

receiving, at the display device, invalid data and GPU timing information for each display refresh cycle after the first refresh cycle that the display device is displaying the first frame.

12. The method of claim 11, further comprising discarding the invalid data.

13. The method of claim 8, further comprising:

determining, at the GPU, a refresh rate of the display device, wherein the display device has a variable refresh rate, based on a rate at which the GPU generates the first frame.

14. A system, comprising:

a memory;

a graphics processing unit (GPU) configured to:

render a plurality of frames for transmission to a display device;

transmit a first frame of the plurality of frames and information associated with the first frame to the display device during a first refresh cycle of the display device, the information indicating a number of display refresh cycles during which the display device is to display the first frame; and omit accessing the first frame from the memory and transmitting the first frame to the display device during a second refresh cycle of the display device subsequent to transmitting the first frame in response to the information indicating that the number of display refresh cycles exceeds one display refresh cycle; and a display device configured to:

display the first frame for the number of display refresh cycles indicated by the information.

15. The system of claim 14, wherein the display device is further configured to:

capture the first frame in response to the information indicating that the number of display refresh cycles exceeds one display refresh cycle.

16. The system of claim 14, wherein the display device is further configured to:

store the first frame at a buffer associated with the display device in response to the information indicating that the number of display refresh cycles exceeds one display refresh cycle.

17. The system of claim 14, wherein the information is based on a refresh rate of the display device exceeding a rate at which the GPU generates the first frame by more than a threshold amount.

18. The system of claim 14, wherein the display device is further configured to:

receive invalid data and GPU timing information from the GPU for each display refresh cycle after the first refresh cycle that the display device is displaying the first frame.

19. The system of claim 18, wherein the display device is further configured to:

discard the invalid data.

20. The system of claim 14, wherein the display device is further configured to:

determine a refresh rate of the display device, wherein the display device has a variable refresh rate, based on a rate at which the GPU generates the first frame.

* * * * *